United States Patent
Hsieh et al.

(10) Patent No.: US 9,898,836 B2
(45) Date of Patent: Feb. 20, 2018

(54) METHOD FOR AUTOMATIC VIDEO FACE REPLACEMENT BY USING A 2D FACE IMAGE TO ESTIMATE A 3D VECTOR ANGLE OF THE FACE IMAGE

(71) Applicant: MING CHUAN UNIVERSITY, Taipei (TW)

(72) Inventors: Chaur-Heh Hsieh, Taipei (TW); Hsiu-Chien Hsu, Taipei (TW)

(73) Assignee: Ming Chuan University, Taipei (TW)

( * ) Notice: Subject to any disclaimer, the term of this patent is extended or adjusted under 35 U.S.C. 154(b) by 0 days.

(21) Appl. No.: 15/220,689

(22) Filed: Jul. 27, 2016

(65) Prior Publication Data

US 2016/0335774 A1 Nov. 17, 2016

Related U.S. Application Data

(62) Division of application No. 14/615,770, filed on Feb. 6, 2015.

(51) Int. Cl.
| | |
|---|---|
| *G06K 9/46* | (2006.01) |
| *G06K 9/00* | (2006.01) |
| *G06T 11/00* | (2006.01) |
| *G06T 11/60* | (2006.01) |
| *G06T 7/73* | (2017.01) |
| *G06T 7/529* | (2017.01) |
| *G06T 7/536* | (2017.01) |
| *G06T 7/11* | (2017.01) |
| *G06T 7/13* | (2017.01) |

(Continued)

(52) U.S. Cl.
CPC .......... *G06T 11/00* (2013.01); *G06K 9/00248* (2013.01); *G06T 7/11* (2017.01); *G06T 7/13* (2017.01); *G06T 7/187* (2017.01); *G06T 7/529* (2017.01); *G06T 7/536* (2017.01); *G06T 7/74* (2017.01); *G06T 7/90* (2017.01); *G06T 11/60* (2013.01); *G06T 2200/04* (2013.01); *G06T 2207/10016* (2013.01); *G06T 2207/10024* (2013.01); *G06T 2207/20068* (2013.01); *G06T 2207/20221* (2013.01); *G06T 2207/30201* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 2009/0262987 A1* | 10/2009 | Ioffe | .................. | G06K 9/00281 382/118 |
| 2013/0286049 A1* | 10/2013 | Yang | ........................ | G09G 5/38 345/649 |
| 2016/0148381 A1* | 5/2016 | Aoki | .................. | G06K 9/00255 382/103 |

FOREIGN PATENT DOCUMENTS

WO  WO 2015001791 A1 *  1/2015  ........... G06T 7/0028

* cited by examiner

*Primary Examiner* — Fred Hu
(74) *Attorney, Agent, or Firm* — Rosenberg, Klein & Lee

(57) ABSTRACT

A method for automatic video face replacement includes steps of capturing a face image, detecting a rotation angle of the face image, defining a region to be replaced in the face image, and pasting a region to be replaced of one of the replaced images having the corresponding rotation angle of the face image into a target replacing region. Therefore, the region to be replaced of a static or dynamic face image can be replaced by a replaced image quickly by a single camera without requiring a manual setting of the feature points of a target image. These methods support face replacement at different angles and compensate the color difference to provide a natural look of the replaced image.

10 Claims, 10 Drawing Sheets

(51) Int. Cl.
*G06T 7/90* (2017.01)
*G06T 7/187* (2017.01)

```
┌─────────────────────────────────────────┐
│ Create a face database for storing a plurality of
│ replaced images with a face image rotation
│ angle one by one by using the method for
│ estimating a 3D vector angle from a 2D face
│                  image.                              ── S005
└─────────────────────────────────────────┘
                    ↓
┌─────────────────────────────────────────┐
│ Obtain a center point from two adjacent points
│ between the first leftmost point and the first
│ rightmost point of the eye regions of the
│ replaced image region, and the second leftmost
│ point and the second rightmost point of the
│ mouth region of the replaced image, and use an
│ arc to connect the first leftmost point, the first
│ rightmost point, the second leftmost point, the
│ second rightmost point, and the center point to
│      form a target replacing region.                ── S006
└─────────────────────────────────────────┘
```

FIG.5

METHOD FOR AUTOMATIC VIDEO FACE REPLACEMENT BY USING A 2D FACE IMAGE TO ESTIMATE A 3D VECTOR ANGLE OF THE FACE IMAGE

REFERENCE TO RELATED APPLICATION

This is a divisional application for applicant's former patent application Ser. No. 14/615,770 filed on Feb. 6, 2015, currently pending.

BACKGROUND OF THE INVENTION

1. Fields of the Invention

The divisional application relates to a method for automatic video face replacement by using a 2D face image to estimate a 3D vector angle of the face image, and more particularly, to the method with the effect of replacing a face image by detecting a rotation angle of the face image and then replacing a region to be replaced of the face image by a replaced image.

2. Descriptions of Related Art

Face replacement technology gains more attentions in recent years, primarily due to its wide scope of applicability in the fields of movies, entertainments and medical cosmetology. For example, when a movie is shot, a stuntman's face image is replaced by a main actor's face image, so that the main actor no longer needs to perform an action of high level of difficulty, and a cameraman needs not to avoid the angle of shooting at the stuntman's face. Such face replacement technique can ensure the safety of the main actor and improve the efficiency of shooting the film and saving the production cost effectively. In the aspect of entertainment, users may replace faces with others to achieve the effect of having fun. In the aspect of medical cosmetology, patients requiring a plastic surgery may observed the result of the surgery ahead of time before deciding whether or not to take the surgery in order to avoid unexpected results.

In a conventional face replacement technique, the feature points of an image to be replaced and a target image are calculated manually, so as to designate a region and an angle to be replaced, and then the range of the calculated feature points of the target image is replaced by a range of calculated feature points of the replaced image. However, this technique is applicable for the replacement of a single static image only, but is difficult to be applied for replacing dynamic images. In addition, it is necessary to manually mark the feature points of the image to be replaced and the target image, and thus the operation is inconvenient to users and time-consuming. Color difference may occur at the boundary of the replaced image easily, and thus the overall visual perception of the replaced image is unnatural. Furthermore, the method of estimating a face angle applied in the replacement process is too complicated and takes lots of computation time. Therefore, this technique fails to provide a quick image replacement.

In view of the aforementioned problems, the inventor of the present invention based on years of experience in the related industry to conduct extensive researches and experiments, and finally designed a face replacement technique in accordance with the present invention to overcome the aforementioned problems of the prior art.

SUMMARY OF THE INVENTION

The present invention overcomes the drawbacks of the conventional face replacement technique that requires the users to manually mark the feature points of the image to be replaced and the target image and causes tremendous inconvenience to the users, and the method of estimating a face angle is time-consuming, and color difference may occur at the boundary of the replaced image easily and result in an unnatural visual perception of the replaced image.

To achieve the aforementioned objective, the present invention provides a method for automatic video face replacement by using a 2D face image to estimate a 3D vector angle of the face image, comprising the steps of:

using a method for estimating a 3D vector angle from a 2D face image, comprising the steps of:

creating a feature vector template including a feature vector model of a plurality of different rotation angles;

detecting a corner of eye and a corner of mouth in a face image to be processed, and defining the corners of eye and the corners of mouth as vertices of a quadrilateral respectively;

defining a sharp point in a vertical direction of the quadrilateral plane, and converting the vertices into 3D coordinates, wherein the sharp point and the vertices of the quadrilateral form a quadrangular pyramid; computing the four vectors from the sharp point to the four vertices whose coordinates are 3D coordinates to obtain a vector set, and matching the vector set with the feature vector model to obtain an angle which has the shortest distance between a feature vector model and the vector set, and defining the angle value as a rotation angle of the input face image, and using a method for creating a face replacement database, comprising the steps of:

creating a face database for storing a plurality of replaced images with a face image rotation angle by using the method for estimating a 3D vector angle from a 2D face image;

defining a region to be replaced in the replaced image; and using a method for replacing a face image, comprising the steps of:

capturing a face image, and detecting a rotation angle of the face image according to the method for estimating a 3D vector angle from a 2D face image;

defining a region to be replaced in the face image, and pasting a region to be replaced of one of the replaced images with the corresponding rotation angle of the face image onto a target replacing region.

Preferably, the region to be replaced is a surface region formed by the vertices.

Preferably, the method for automatic video face replacement further comprises the steps of:

obtaining a center point between two adjacent vertices, and shifting the center point towards the exterior of the quadrilateral, and using an arc to connect the vertices and the center point to form the region to be replaced.

Preferably, the arc is a parabola, and the surface region is in the shape of a convex hull.

Preferably, the corner of eye and the corner of mouth are detected from two eye regions and a mouth region of the face image respectively, and a first leftmost point and a first rightmost point are obtained from a top edge of the eye region respectively, and a second leftmost point and a second rightmost point mouth region are obtained from a bottom edge of the eye region respectively, and a center point is obtained from two adjacent points between the first leftmost point, the first rightmost point, the second leftmost point and the second rightmost point, and shifting the center point towards the exterior of the quadrilateral, an arc is used for connecting the first leftmost point, the first rightmost point, the second leftmost point, the second rightmost point and the center point to form a closed surface region which is defined as the region to be replaced.

Preferably, The method for automatic video face replacement as claimed in claim 1, further comprising the steps of: calculating the histograms of a R channel, a G channel and a B channel of the replaced image and the region to be replaced (called target replacing region) respectively, and normalizing the histogram into a probability; and using the probability to compute expectation values of the replaced image and the target replacing region respectively to obtain a zoom factor of the replaced image and the target replacing region, and adjusting the values of the R channel, the G channel and the B channel according to the zoom factor.

Preferably, the region to be replaced is layered gradually and pasted onto the region to be replaced by an edge feathering method.

Preferably, the method for automatic video face replacement further comprises the steps of using the boundary of the region to be replaced of the replaced image and the region to be replaced as standards to set a higher value to the transparency of a pixel at an edge of the region to be replaced and outside the edge of the region to be replaced, and a decreasingly lower value at a position progressively moving towards the inside of an edge of the region to be replaced.

Preferably, the higher value is equal to 1, and the lower value is equal to 0.

Preferably, the face image is a static image or a dynamic image, and the face image is captured instantly by a camera.

In summation of the description above, the present invention has the following advantages and effects:

1. The present invention performs the steps of forming the vertices of a quadrilateral through the corners of eye and corners of mouth of a planar image, defining a sharp point in the vertical direction of the quadrilateral, computing the four vectors from the sharp point to four vertices whose coordinates are 3D coordinates to obtain the vector set, matching the vector set with the feature vector model to obtain an angle which has the shortest distance between a feature vector model and the vector set, and defining the angle value as the rotation angle of the input face image. Obviously, the present invention can estimate the rotation angle of a face image instantly without any manual operation or complicated and huge computations. The invention is applicable for dynamic and static images and almost synchronized with the dynamic image without any delay.
2. The present invention defines and forms the region to be replaced by the corners of eye and the corners of mouth in a face image, so that the region to be replaced will change according to the rotation of the face image, so that the face replacement is done precisely without any deviation. In addition, the values of the R channel, G channel and B channel of the target replacing image are adjusted according to the zoom factors between the RBG color of the replaced image and that of the target replacing region, and the replaced image is pasted onto the target replacing region by an edge feathering method, so that the color of the target replacing region is made to be natural.
3. The present invention simply requires a low cost camera and personal computer, and does not require the installation of any additional expensive equipment.

BRIEF DESCRIPTION OF THE DRAWINGS

FIG. 5 is a flow chart of a method for creating a face replacement database by using a 2D face image to estimate a 3D vector angle of the face image in accordance with the present invention;

DETAILED DESCRIPTION OF THE PREFERRED EMBODIMENT

The present invention will become more obvious from the following description when taken in connection with the accompanying drawings which show, for purposes of illustration only, a preferred embodiment in accordance with the present invention.

Figure 1:
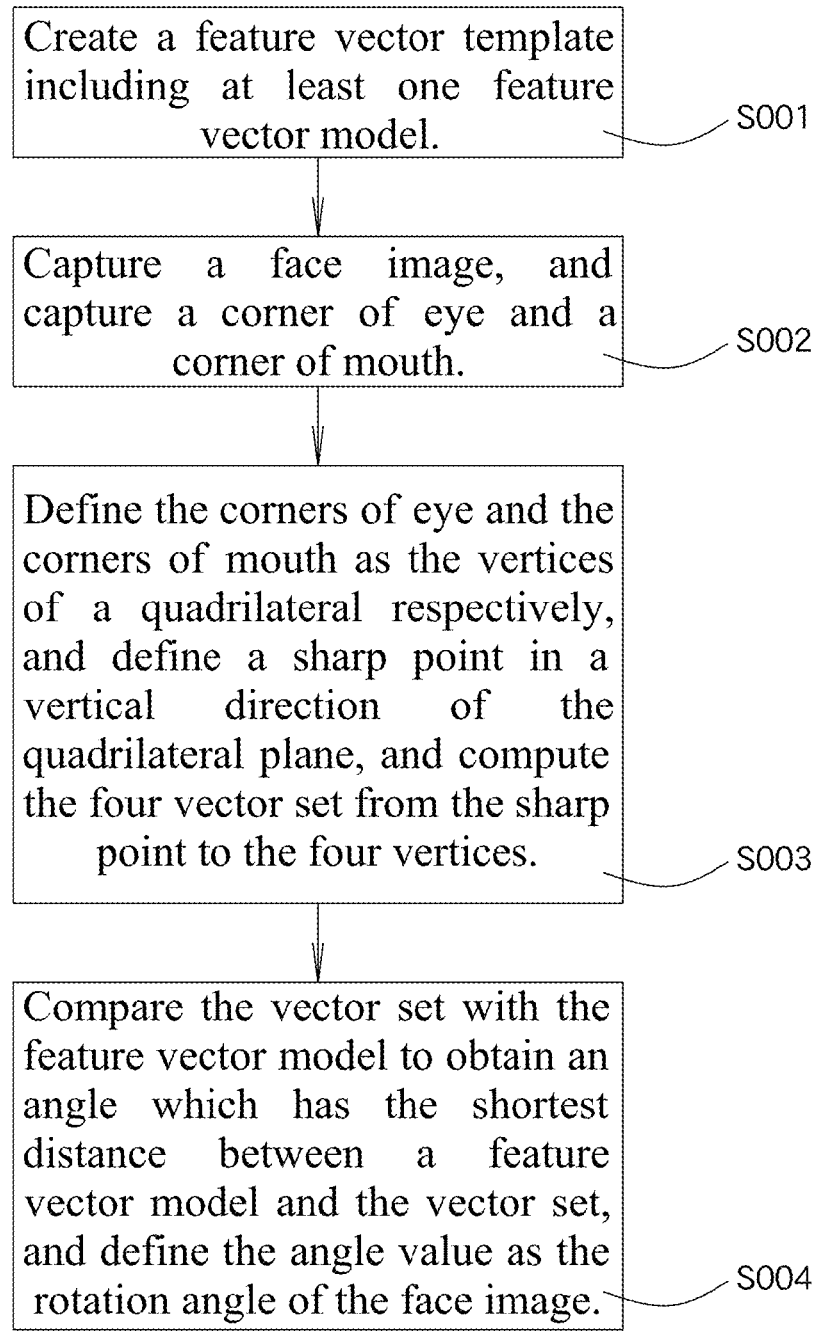
FIG. 1 is a flow chart of a method for estimating a 3D vector angle from a 2D face images in accordance with the present invention.

With reference to FIG. 1 for a method for estimating a 3D vector angle from a 2D face image in accordance with the present invention, the method comprises the following steps of:

S001: Create a feature vector template, wherein the feature vector template includes a feature vector model of a plurality of different rotation angles and a standard eyes distance which is the distance between two eyes of the face image and used for scale normalization. In general, the feature vector model is created offline in advance. For a general user's face rotation, the rotation is performed within a range of rotation angles (say from −30° to 30°) with respect to the X-axis, Y-axis and Z-axis, so that if the X-axis, Y-axis and Z-axis are quantized into rotation units of $N_1$, $N_2$ and $N_3$ respectively, then a feature vector model containing N feature vectors is formed, and its mathematical equation 1 is given below:

$$N = N_1 \times N_2 \times N_3 \qquad \text{[Mathematical Equation 1]}$$

Therefore, the vector rotation matrixes within a range of the rotation angles with respect to the X-axis, Y-axis and Z-axis are multiplied to define a feature vector model.

Figure 2:
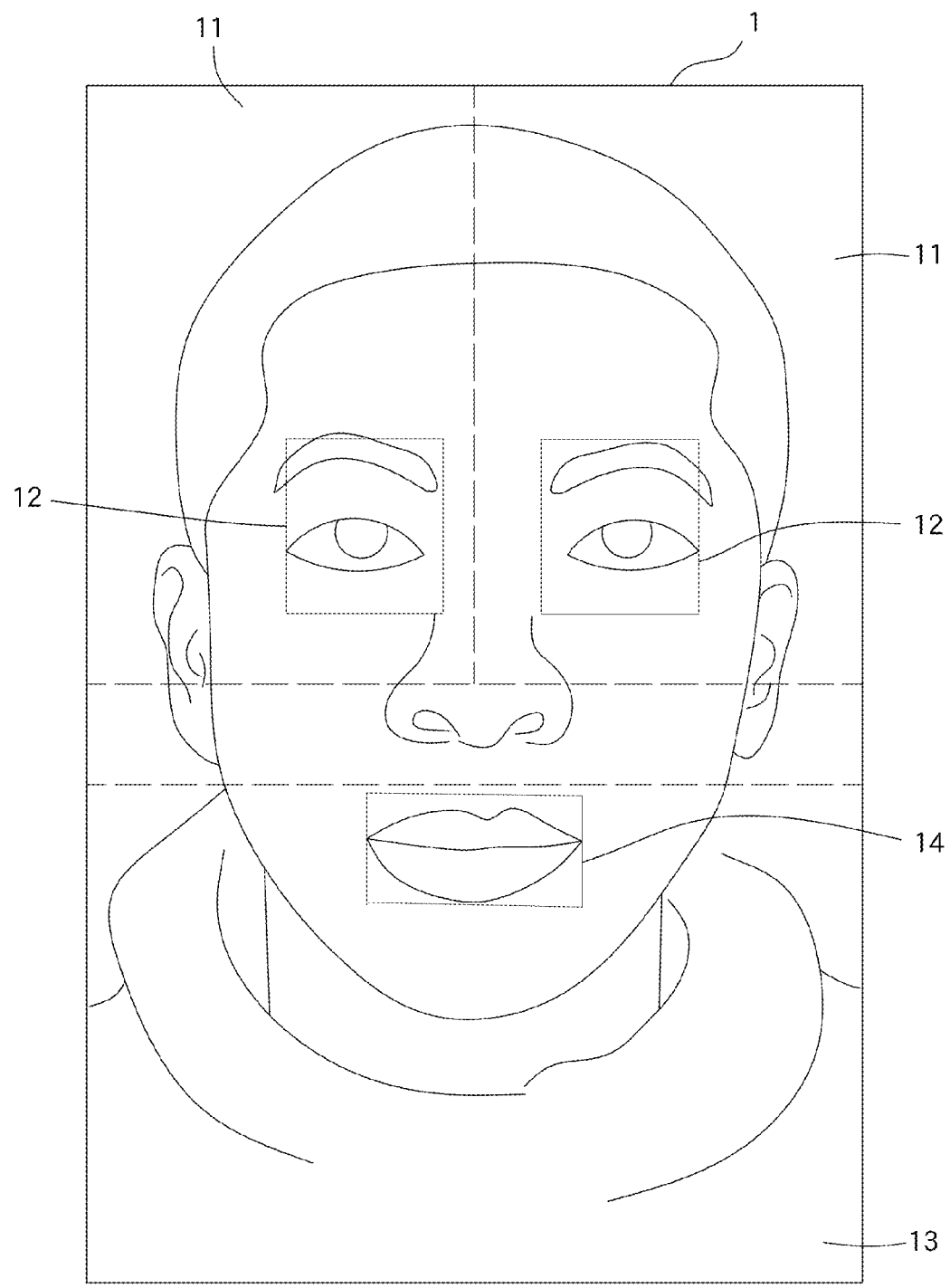
FIG. 2 is a schematic view of a first region of interest and a second region of interest defined in a face image in accordance with the present invention.

S002: Capture a static or dynamic image by a camera such as a webcam or capture a single face image 1 through a transmission network as shown in FIG. 2. In this preferred embodiment, Haar features is used as the features for classification, and Cascade Adaboost classifier is used to detect a human face and facial features. To detect a corner of eye and a corner of mouth of the face image 1 effectively, a first region of interest 11 (ROI) is defined separately on both left and right halves of an upper part of the face image 1 as two eye regions 12 in advance, and a second region of interest 13 is defined at a position within one-third of a lower part of the face image 1 as a mouth region 14, and a corner of eye and a corner of mouth are searched from the eye region 12 and the mouth region 14 respectively. Since this invention relates to the detection of corners of eye and corners of mouth, the detection of a corner of eye is used as an example to illustrate the technical characteristics of the invention, wherein the first region of interest 11 is defined in the face image first, and after the first region of interest 11 is searched, a corner of eye is searched from the eye region 12. In a preferred embodiment, the eye region 12 situated on the left half of the face image 1 has a start point from the left side of the face image 1 for scanning the brightness of a skin region. Since the skin brightness of the corner of eye is darker than that of the neighborhood of the corner of eye, therefore the lowest scanned brightness occurs at the corner of eye, and the eye region 12 situated on the right half of the face image 1 similarly has a start point from the right side of the face image 1 for scanning the brightness of a skin region to obtain the corner of eye. As to the search for the corner of mouth, the same method for scanning the corner of eye is used, but this corner of eye and corner of mouth searching method is used for the purpose of illustrating the present invention only, but not intended for limiting the scope of the invention.

Figure 3:
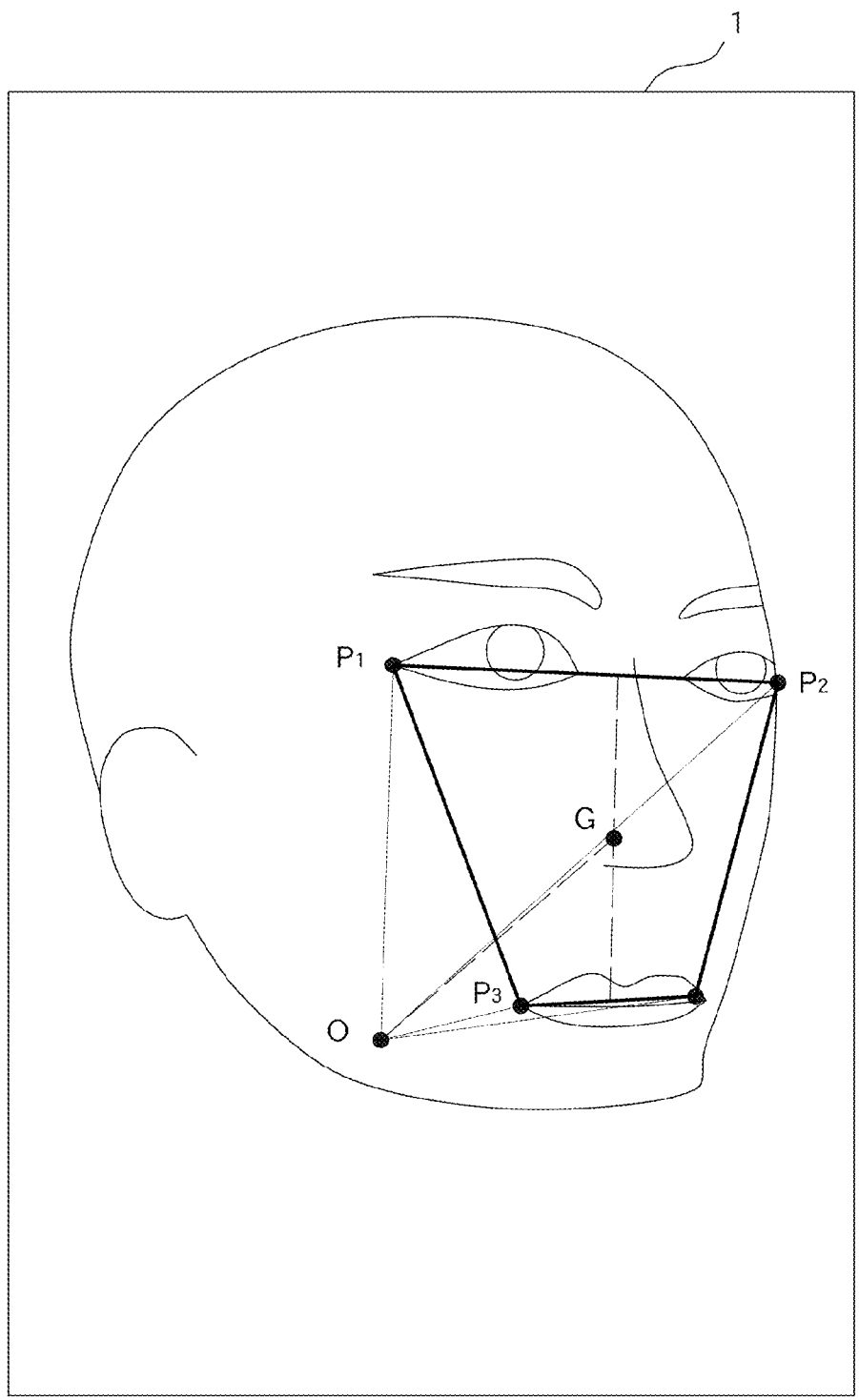
FIG. 3 is a schematic view of a vector set obtained from a face image in accordance with the present invention.
Figure 4:
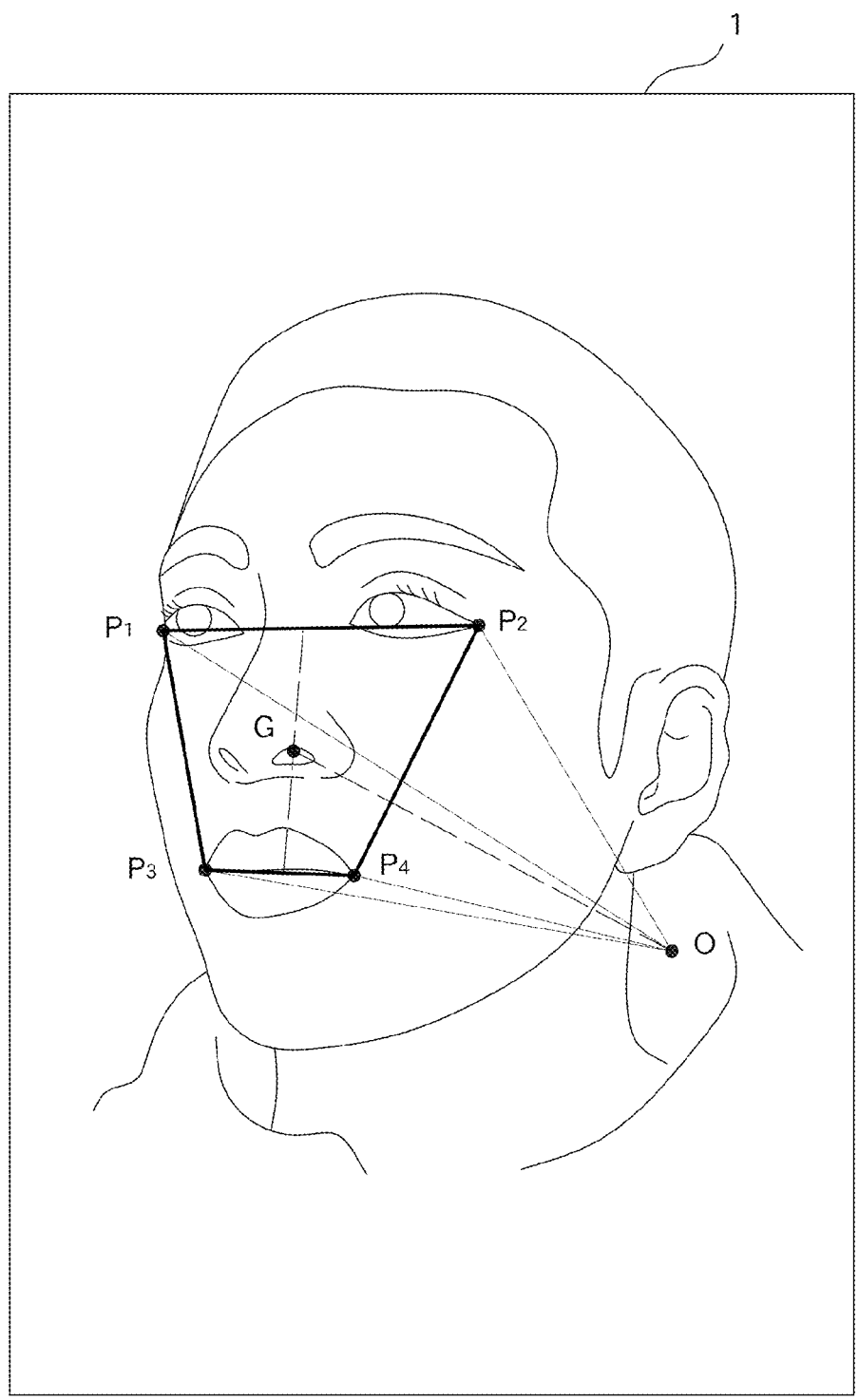
FIG. 4 is a schematic view of a vector set of different rotation angles of a face image in accordance with the present invention.

S003: Define the corner of eyes and the corners of mouth are the vertices $P_1$, $P_2$, $P_3$, $P_4$ of a quadrilateral respectively as shown in FIG. 3. Since the size of each face image may not be the same due to the factor of the shooting distance of each face image 1 from the camera, the distance from the vertices of corners of eye is computed for scale normalization in order to determine the angle of the face image 1 accurately and correct the error by the scale normalization. Since the face image 1 is a 2D image, the coordinates of the vertices are 2D coordinates. To standardize the rotation angle of each face image 1 for different face images 1, this preferred embodiment computes the height h and the 2D coordinates $(x_0, y_0)$ and the centroid G of the quadrilateral, while converting the vertices and the centroid into 3D coordinate, so that the coordinate value of the vertices and the centroid G situated at the third dimension is equal to 0. For example, the 3D coordinates of the centroid are represented by $(x_0, y_0, 0)$, and a multiple constant k is defined, and a sharp point O is extended from the centroid G to a predetermined multiple of height h in a vertical direction of the quadrilateral plane. In other words, the sharp point O is defined at a position of k times of the height h, such that the 3D coordinates of the sharp point O are represented by $(x_0, y_0, kh)$, and the sharp point O and the vertices $P_1$, $P_2$, $P_3$, $P_4$ of the quadrilateral form a quadrangular pyramids, and a scale normalization of the quadrangular pyramid is performed according to the standard eyes distance and distance between the vertices of the corners of eye, and the four vectors $\overline{OP_1}$, $\overline{OP_2}$, $\overline{OP_3}$, $\overline{OP_4}$ from the sharp point O to the vertices $P_1$, $P_2$, $P_3$, $P_4$ are computed to obtain a vector set. In FIG. 4, different rotation angles of the face image 1 result in different quadrangular pyramids and different vector sets.

S004: Compare the vector set with the feature vector model to obtain an angle which has the shortest distance between the feature vector model and the vector set. Define the angle value as the rotation angle of the input face image 1.

In FIG. 5, the present invention provides a method for creating a face replacement database by using a 2D face image to estimate a 3D vector angle of the face image, and the method comprises the following steps:

S005: Create a face database for storing a plurality of replaced images with a face image rotation angle by using the method for estimating a 3D vector angle from a 2D face image, and obtain a replaced image 2 of the rotation angle of the face image 1, wherein the replaced image 2 is obtained by capturing a face image 1 by a camera such as a webcam, and the face image 1 may be a static or dynamic image, or by selecting and uploading a static or dynamic image by users, and the rotation angles of the face image 1 detected by the face angle estimation method are saved one by one to form the replaced image 2.

Figure 6:
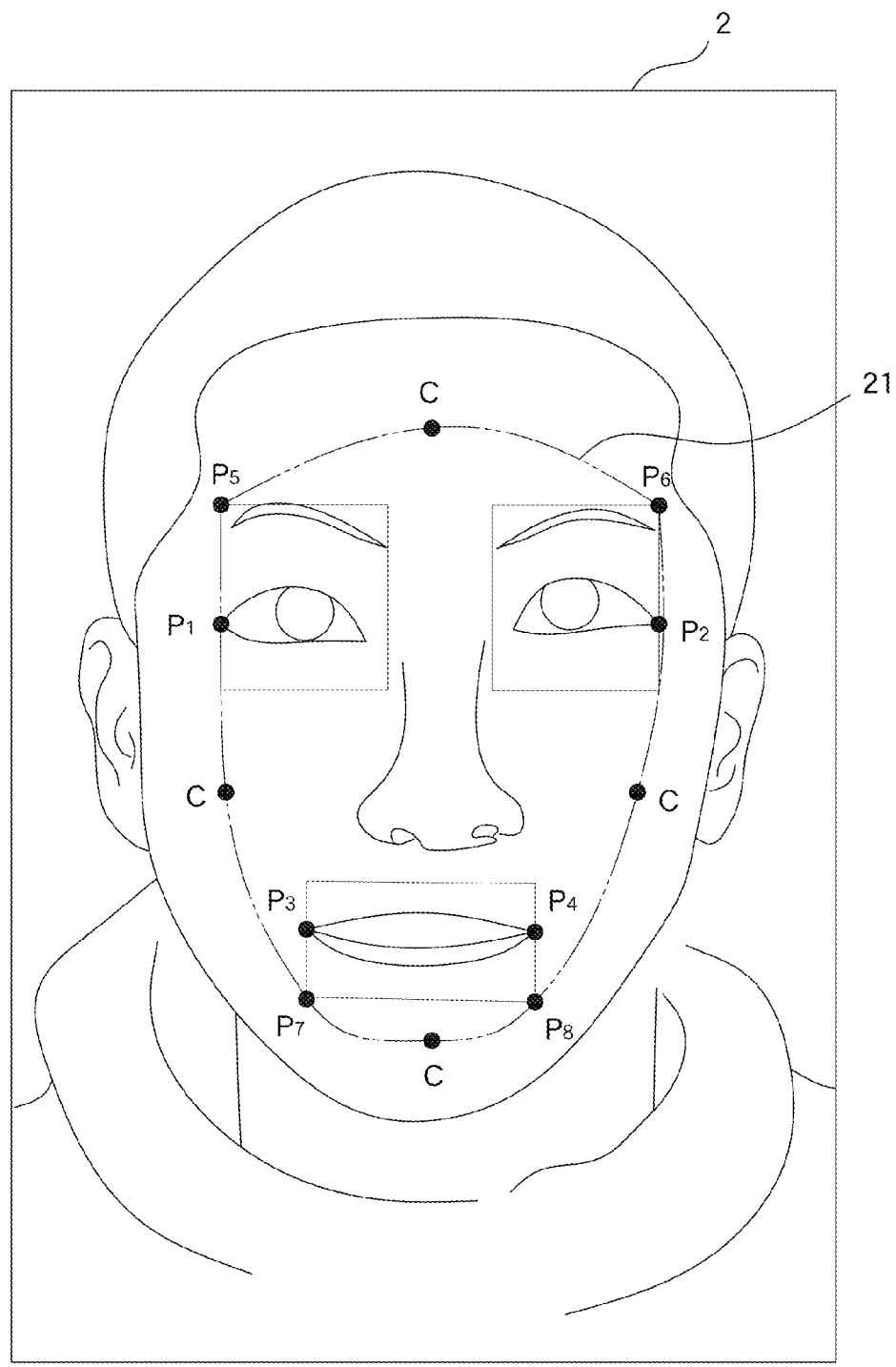
FIG. 6 is a schematic view of a region to be replaced defined in a replaced image in accordance with the present invention.

S006: Define a target replacing region 21 in the replaced image 2 to assure the replacement of the replacing portion by the replaced image 2, wherein the region to be replaced is a surface region formed by the vertices $P_1$, $P_2$, $P_3$, $P_4$. In a preferred embodiment, a center point C is obtained respectively between two adjacent vertices $P_1$, $P_2$, $P_3$, $P_4$, and the center point C is shifted towards the exterior of the quadrilateral, and an arc is used for connecting the vertices and the center point to form a target replacing region 21. In order to provide a natural look of the replaced image 2, the arc is a parabola, and the surface region is preferably in the shape of a convex hull. In FIG. 6, a first leftmost point $P_5$ and a first rightmost point $P_6$ are obtained from a top edge of the eye region 12, such that the first leftmost point $P_5$ and the first rightmost point $P_6$ are higher than the vertices $P_1$, $P_2$ of the original corner of eye, and a second leftmost point $P_7$ and a second rightmost point $P_8$ are obtained from the bottom edge of the mouth region 14 such that the second leftmost point $P_7$ and the second rightmost point $P_8$ are lower than the vertices $P_3$, $P_4$ of the original corner of mouth, and a center point C is obtained from two adjacent points between the first leftmost point $P_5$, the first rightmost point $P_6$, the second leftmost point $P_7$ and the second rightmost point $P_8$, and the center point C is shifted towards the exterior of the quadrilateral, and an arc is used for connecting the first leftmost point $P_5$, the first rightmost point $P_6$, the second leftmost point $P_7$, the second rightmost point $P_8$ and the center point C to form a closed surface region which is defined as the target replacing region 21.

Figure 7:
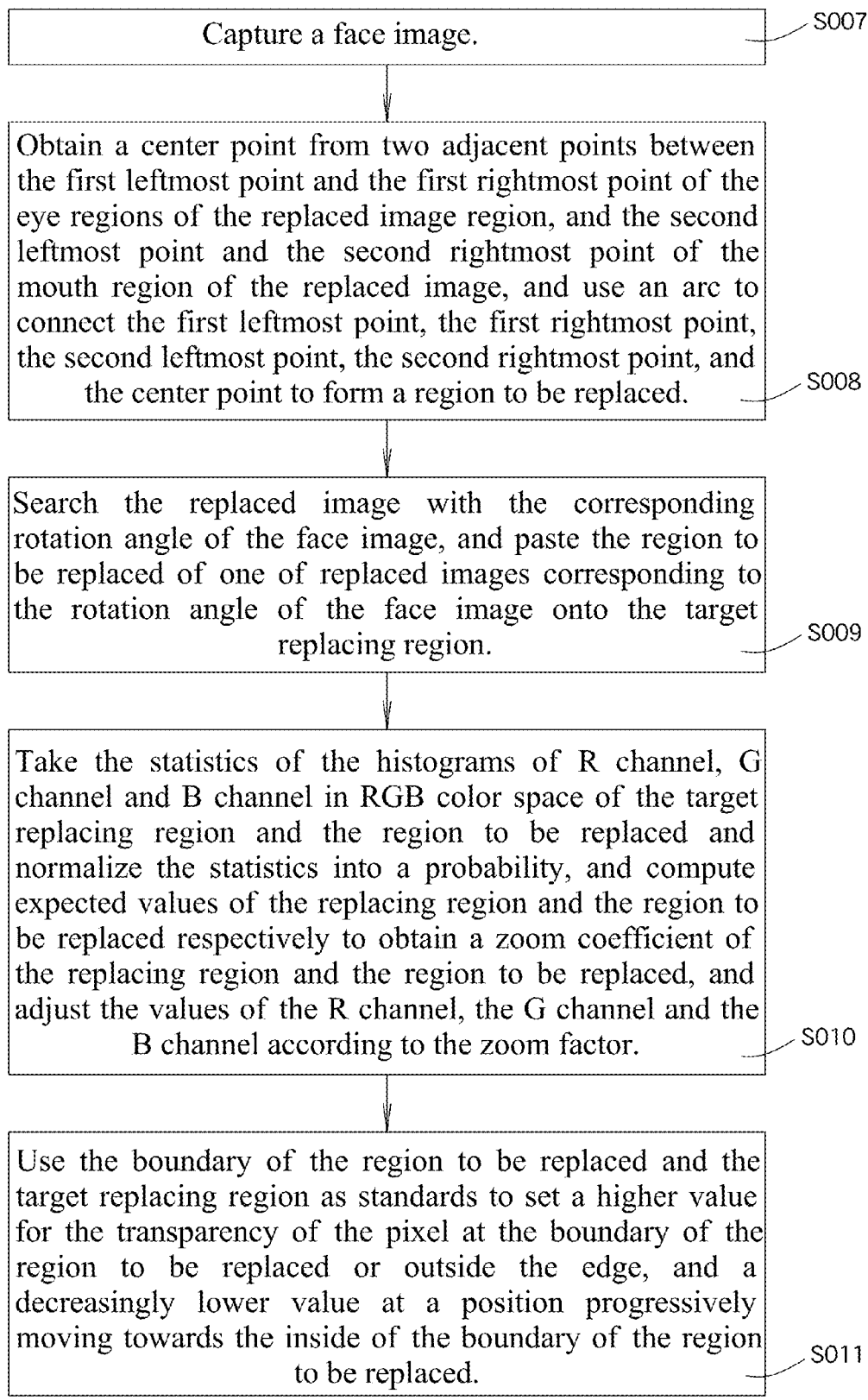
FIG. 7 is a flow chart of a method for automatic video face replacement by using a 2D face image to estimate a 3D vector angle of the face image in accordance with the present invention.

With reference to FIG. 7 for a method for automatic video face replacement by using a 2D face image to estimate a 3D vector angle of the face image, and the method comprises the following steps:

S007: Capture a face image 1 through a camera such as webcam, and the face image 1 may be a static or dynamic image, or select and upload a static or dynamic face image 1 by users, and a rotation angle of the face image 1 is detected according to the method for estimating a 3D vector angle from a 2D face image.

Figure 8:
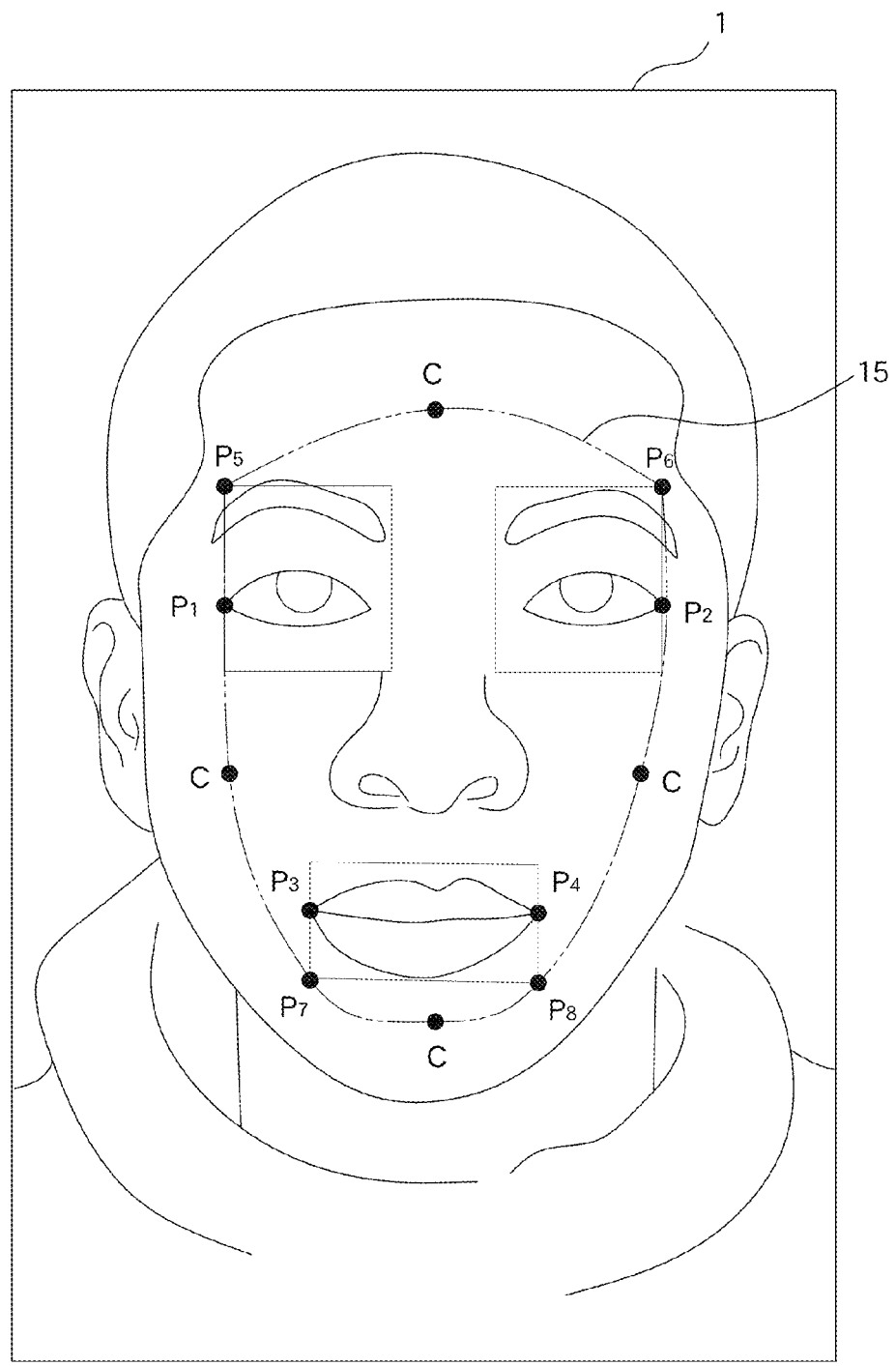
FIG. 8 is a schematic view of a region to be replaced defined in a face image in accordance with the present invention.
Figure 9:
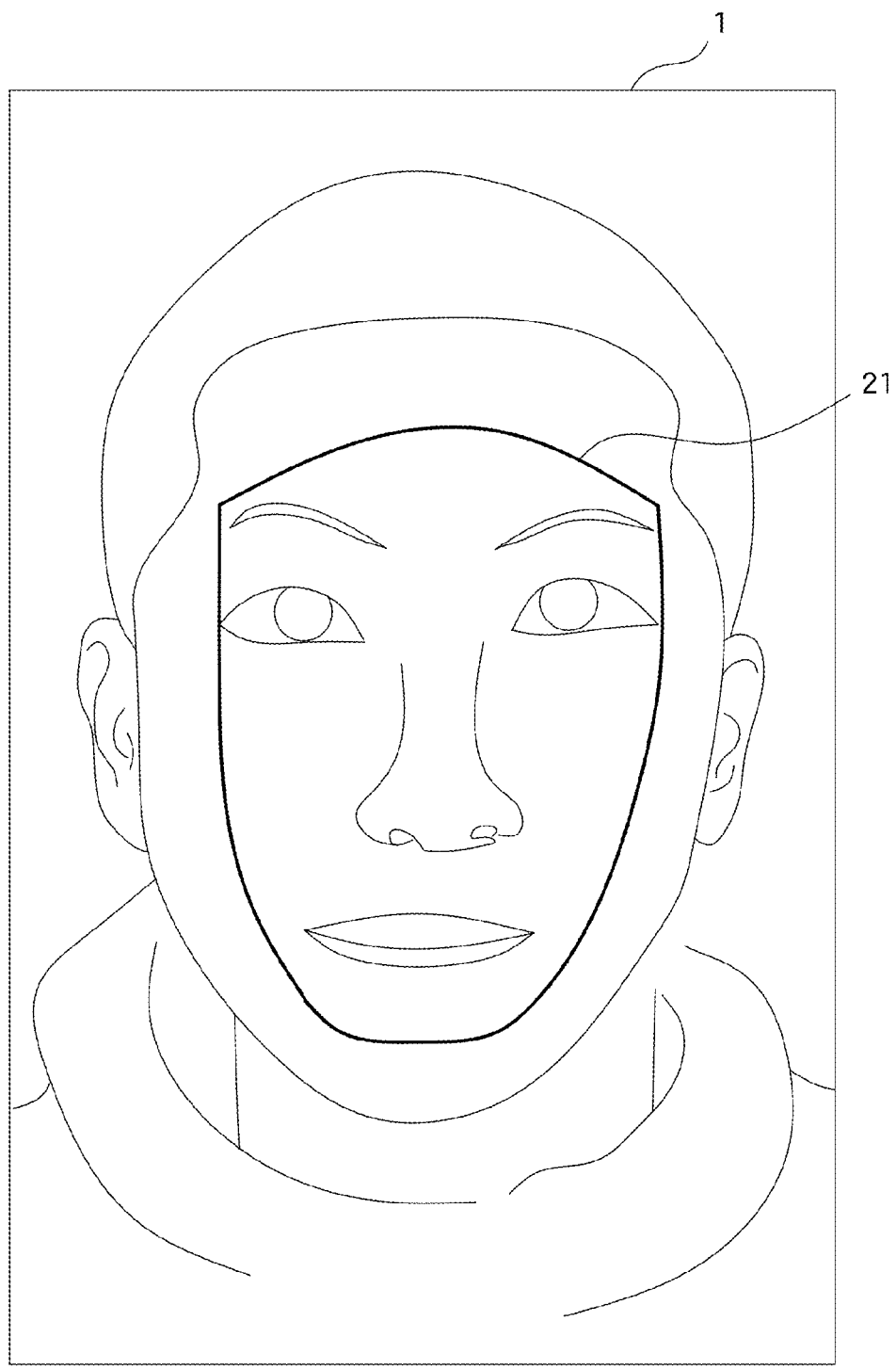
FIG. 9 is a schematic view of a region to be replaced pasted onto a target replacing region in accordance with the present invention.

S008: Define a region to be replaced 15 in the face image 1 as shown in FIG. 8, wherein the region to be replaced 15 is defined by the same method of defining the target replacing region 21 in the aforementioned step S006, and thus the method will not be repeated.

S009: Search the replaced image 2 with the rotation angle of the corresponding face image 1, so that the target replacing region 21 of one of replaced images 2 corresponding to the rotation angle of the face image 1 is pasted onto the region to be replaced 15.

S010: Since the sewing and processing portion of the face has been processed by adjusting the color and brightness of the source image, and processing the boundary between sewing portions of the image, the result must be adjusted after the replacement takes place, so as to give a more natural and coordinative image. However, the color and brightness of the region to be replaced 15 and the target replacing region 21 have a difference to a certain extent, so that it is necessary to adjust the color and brightness of the target replacing region 21 to provide a natural visual effect of the replaced image. Therefore, the statistics of the histograms of R channel, G channel and B channel in RGB color space of the region to be replaced 15 and the target replacing region 21 are taken and normalized into a probability (i), while avoiding a black region from affecting the computation result. In the computation process, 0 is not included in the range, and the probability is used for computing the expected values of the region to be replaced 15 and target replacing region 21 as shown in the following mathematical equation 2:

$$E = \sum_{i=1}^{n} ip(i)$$ [Mathematical Equation 2]

Therefore, zoom factors of the R channel, G channel and B channel between the region to be replaced 15 and the target replacing region 21 are computed, and the values of the R channel, G channel and B channel of the target replacing region 21 are computed according to the zoom factor as given in the following mathematical equation 3:

$$C'_i = C_i * w_i, i=1(B), 2(G), 3(R),$$ [Mathematical Equation 3]

S011: Although the color of the target replacing region 21 after being replaced may match the expected value of the color of the replaced region, yet there may be a slight difference of the color and brightness at the boundary. To compensate the color and bright difference, the transparency value of the pixels at the boundary of the target replacing region 21 or outside the boundary is set a higher value, and a decreasingly lower value at a position progressively moving towards the inside of an edge of the region to be replaced. The compensation can be represented as the e following mathematical equation 4.

$$I_{dst(x,y)} = \alpha I_{src(x,y)} + (1-\alpha) I_{tgt(x,y)}$$ [Mathematical Equation 4]

Figure 10:
FIG. 10 is a schematic view of an application of pasting a replaced image onto a target replacing region of a face image in accordance with the present invention.

Wherein, $I_{dst(x,y)}$ is an image of the region after compensation; $I_{src(x,y)}$ is an image of the target replacing region 21; $I_{tgt(x,y)}$ is an image of the region to be replaced 15, and $\alpha$ is the weight in the range [0,1], so that the image to be replaced 2 may be gradually layered and pasted on the region to be replaced 15 by an edge feathering method as shown in FIG. 10. As a result, a natural face image 1 is shown in the region to be replaced 15 after being replaced.

While we have shown and described the embodiment in accordance with the present invention, it should be clear to those skilled in the art that further embodiments may be made without departing from the scope of the present invention.

What is claimed is:
1. A method for automatic video face replacement, comprising:
   creating a face database for storing a plurality of replacement face images, each replacement face image having a rotation angle determined according to a method for estimating a 3-D vector angle from a 2-D face image;
   defining a target replacing region in each replacement face image;
   capturing a face image;
   determining a rotation angle of the captured face image according to the method for estimating a 3-D vector angle from a 2-D face image;
   defining a target region in the captured face image;
   selecting one of the replacement face images having a rotation angle corresponding to that of the captured face image; and
   placing the target replacing region of the selected replacement face image over the target region of the captured face image,
   wherein the method for estimating a 3-D vector angle from a 2-D face image includes:
      creating a feature vector template including a feature vector model of a plurality of different rotation angles,
      detecting a corner of each of two eyes and two corners of a mouth in a face image to be processed,
      defining the corners of the eyes and the two corners of the mouth as respective vertices of a quadrilateral,
      defining a sharp point displaced in an orthogonal direction relative to the quadrilateral plane,
      converting the vertices into 3-D coordinates, wherein the sharp point and the vertices of the quadrilateral form a quadrangular pyramid,
      computing four 3-D vectors, each 3-D vector extending from the sharp point to a respective one of the four vertices of the quadrilateral, wherein the coordinates of said 3-D vectors are 3-D coordinates, and wherein said 3-D vectors are computed to obtain a vector set,
      matching the vector set with the feature vector model to obtain an angle which has the shortest distance between a feature vector model and the vector set, and
      defining the obtained angle value as a rotation angle of the input face image.

2. The method for automatic video face replacement as claimed in claim 1, wherein the target replacing region is a surface region formed by the vertices of the quadrilateral.

3. The method for automatic video face replacement as claimed in claim 2, further comprising:
   obtaining a center point between two adjacent vertices of the quadrilateral;
   shifting the center point towards an exterior of the quadrilateral; and
   connecting the vertices and the center point with an arc, the arc thereby defining a boundary of the surface region.

4. The method for automatic video face replacement as claimed in claim 3, wherein the arc is a parabola, and the surface region is in the shape of a convex hull.

5. The method for automatic video face replacement as claimed in claim 2, wherein:
   the corners of the eyes are detected from first and second eye regions of the face image, respectively, and the corners of the mouth are detected from a mouth region of the face image,
   a first leftmost point and a first rightmost point are obtained from top edges of the first and second eye regions, respectively, and a second leftmost point and a second rightmost point are obtained from a bottom edge of the mouth region,
   a center point is obtained from two adjacent points between the first leftmost point, the first rightmost point, the second leftmost point, and the second rightmost point, the center point then being shifted towards the exterior of the quadrilateral, and an arc connects the first leftmost point, the first rightmost point, the second leftmost point, the second rightmost point, and the shifted center point, the arc thereby defining a boundary of the surface region.

6. The method for automatic video face replacement as claimed in claim 1, further comprising:
calculating histograms of a R channel, a G channel, and a B channel of the target region and of the target replacing region respectively;
normalizing the histograms into a probability;
computing respective expectation values of the target region and the target replacing region according to the probability, to thereby obtain a zoom factor; and
adjusting values of the R channel, the G channel and the B channel for the target replacing region according to the zoom factor.

7. The method for automatic video face replacement as claimed in claim 6, wherein the target replacing region is layered gradually and pasted onto the target region according to an edge feathering method.

8. The method for automatic video face replacement as claimed in claim 7, further comprising:
setting a highest transparency value to pixels disposed at an edge of the target replacing region and outside the edge of the target replacing region, and
setting progressively decreasing transparency values to pixels at positions progressively disposed towards the inside of the edge of the target replacing region.

9. The method for automatic video face replacement as claimed in claim 8, wherein the highest transparency value is equal to 1, and a lowest transparency value is equal to 0.

10. The method for automatic video face replacement as claimed in claim 1, wherein the captured face image is a static image or a dynamic image, and the captured face image is captured instantly by a camera.

* * * * *